Jan. 18, 1949. G. A. LYON 2,459,568
METHOD OF MAKING WHEEL BALANCING WEIGHT
Filed April 10, 1944

Inventor
GEORGE ALBERT LYON.
by Charles H. Will Attys.

Patented Jan. 18, 1949

2,459,568

UNITED STATES PATENT OFFICE 2,459,568

METHOD OF MAKING WHEEL BALANCING WEIGHTS

George Albert Lyon, Allenhurst, N. J.

Application April 10, 1944, Serial No. 530,357

2 Claims. (Cl. 29—148)

This invention relates to a wheel balancing weight and a method of making the same.

The subject matter hereof has been divided from my copending patent application Serial No. 409,992, filed September 8, 1941, now Patent No. 2,361,406, issued October 31, 1944.

In appending accessory parts such as wheel balancing weights and ornamental trim rings and disks to a wheel structure it is highly important, first, that these appended parts be readily insertable and removable, preferably with a snap-on, pry-off engagement, and second, that when so attached these parts be held securely and removably with relation to the wheel assembly thereby to eliminate rattling and vibration of the parts and slippage thereof from their intended positions. Furthermore, it is important particularly, in the case of a wheel balancing weight that it not only be readily insertable and removable but that it be adjustable along a concentric path with respect to the wheel structure without removal of either the weight itself or the retaining means which holds it in place and that once placed in its adjusted position on this path it be securely held there against accidental sliding.

An object of this invention is to provide an improved and simplified form of wheel balancing weight.

Still another object of this invention is to provide a novel method of manufacturing wheel balancing weights.

Still another object of the invention is to provide an improved wheel balancing weight configurated to fit securely in the wheel assembly and adjacent the retaining means in snap-on and pry-off relationship and to provide an improved method of manufacturing these weights whereby the desired configuration of each individual weight is automatically obtained in the manufacturing procedure and whereby the weights may be manufactured in long lengths and scored or otherwise weakened at intermediate points to facilitate the removal of individual weights from the manufactured lengths thereof.

In accordance with the general features of this invention there is provided an improved wheel balancing weight configurated to cooperate more efficiently with the retaining means therefor in that the weight is grooved to receive the retaining means and is configurated arcuately to provide a flush engagement with the portion of the wheel rim against which it bears, this grooved and arcuate configuration being provided automatically in the manufacturing operations by rolling the weights in long lengths and in spiral form thereby to impart to each the arcuate configuration desired.

Another feature of the invention relates to the provision of a novel method of manufacturing these wheel balancing weights which includes the steps of rolling the weights into relatively long lengths in spiral form and in turn having a radius substantially equal to that of the curvature of the arcuate configuration desired and scoring the lengths to facilitate removal of the individual weights from the spiral form.

Other objects and features of this invention will more fully appear from the following detail description taken in connection with the accompanying drawings which illustrate a single embodiment thereof and in which.

Since it is believed that my invention may be best understood by description of it in conjunction with its application to a wheel, I shall first hereinafter describe a wheel structure to which the same is applied and whereby the advantageous features of the wheel balancing weight are utilized.

Figure 1:
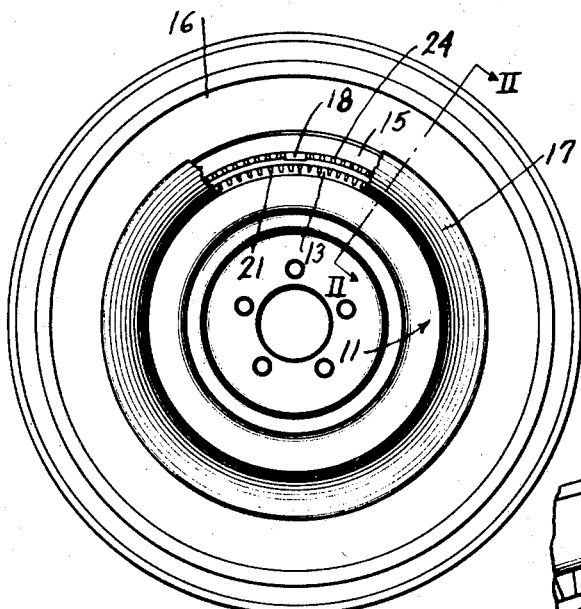
Figure 1 is a side view of a wheel structure partly broken away and illustrating how my novel balancing weights cooperate therewith.
Figure 2:
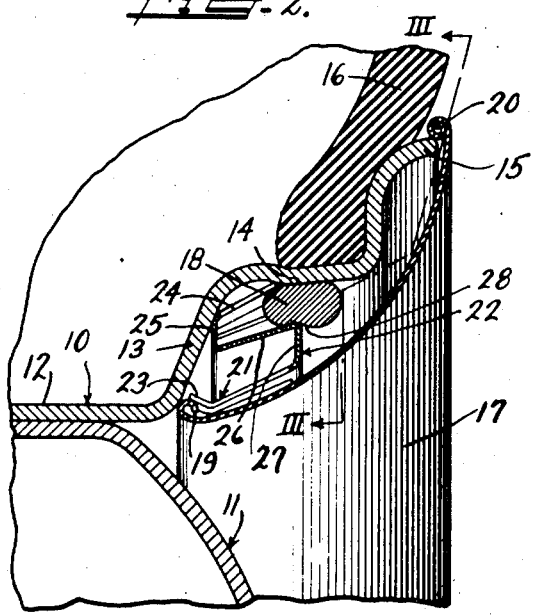
Figure 2 is an enlarged fragmentary cross-sectional view taken on the line II—II of Figure 1 and showing more in detail how the balancing weights cooperate with the retaining means for holding them on the wheel.

As best shown in Figures 1 and 2, the reference character 10 designates generally a conventional drop center rim of a wheel which includes a body part 11 secured thereto as by welding or the like. The rim 10, only one side of which is shown in Figure 2, and as is well known in the art, is provided with a base flange 12, opposite side flanges 13, opposite intermediate flanges 14 and opposite edge portions 15, a suitable tire 16 being shown mounted in operative position upon the rim.

As is well known by those skilled in the art, the increased efficiency and the higher speeds of modern motor vehicles render a wheel which is unbalanced upon its axle, more detrimental to the efficient operation of the car. Furthermore, in addition to the reduction in the efficiency of the operation of the vehicle, with regard to wear of parts, gas mileage and the like, this unbalanced condition renders the operation of the vehicle at such high speeds dangerous in that it causes the wheels, particularly those affected by the steering gear, to shimmy, with the result that vehicles from time to time become uncontrollable by the operator. To the end that the above conditions may be eliminated and the wheel brought into a state of perfect balance, those skilled in the art have found that the addition of small weights to the wheel at proper points reestablishes the desired balance. These weights, however, must be moved from time to time since the state of balance obtained by the addition thereof to the wheel structure is lost after the tires begin to wear in an uneven manner. It is therefore highly desirable that these weights be attachable and detachable with great ease and yet securely and that they be available for adjusting movement without requiring complicated manipulation and the use of tools to any great extent.

It has also been found that the addition of these weights to readily accessible portions of the wheel structure renders that structure unsightly and unsymmetrical and it is therefore highly desirable that they be associated in an assembly in which they are concealed and therefore do not detract from the appearance of the assembly.

Figure 3:
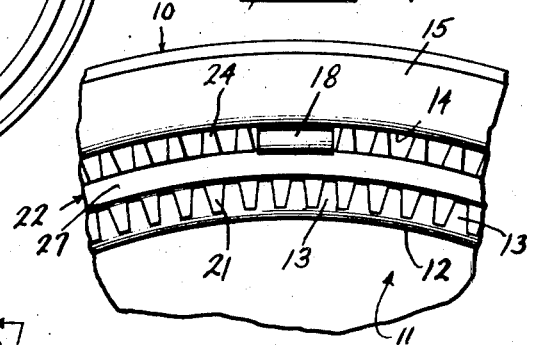
Figure 3 is a fragmentary enlarged detail view looking at the front of one of the weights on substantially the line III—III of Figure 2.

In order that the latter advantage be attained it is contemplated that the wheel balancing weights be concealed behind an ornamental trim ring designated as 17 in Figures 1, 2 and 3, this trim ring, like the weights, designated as 18 in Figures 1 and 2, being mounted in the wheel assembly for ready detachment to render the weights accessible for adjustment.

The trim ring 17 as shown is formed with a generally arcuate cross section, its convex surface being disposed outwardly of the wheel assembly when it is mounted thereon. The inner and outer peripheral edges of the ring 17 are beaded as at 19 and 20, the bead 20 being provided by a multiplicity of turns to the end that greater strength and rigidity are imparted to the outer peripheral edge thereof. When the trim ring 17 is mounted in the wheel assembly the bead 20 is disposed adjacent the respective edge portion 15 of the wheel rim while the bead 19 is urged past the body of the resilient fingers 21 of a retaining member 22 to be more fully described presently.

As will be seen from Figure 2, the retaining ring 22 is of general S shape cross section and is secured in the wheel structure by outwardly extending finger members 24 which are adapted to spring into engagement with the undersurface of the intermediate flange 14 of the rim to bite into the metal of the rim and thus prevent removal of the ring 22 from the wheel assembly. The fingers 21 are provided with an elongated body portion and terminate in upturned end portions 23, the junction between the elongated portion and the end portions constituting a corner past which the bead 19 must be urged as it is forced into its ultimate position. It will be readily understood that when the trim ring 17 is urged axially inwardly and the bead 19 is thus forced beyond the above-mentioned corners of the resilient fingers 21, the ring 17 will be securely maintained in a position wherein it extends substantially between the junction of the body member 11 with the rim 10 and the edge portion 15 of the rim, thereby covering the major outer exposed portion of the rim to present a neat and attractive appearance. It will also be readily understood that when so secured to the rim, the ring 17 may be easily and quickly removed from the assembly merely by prying the bead 19 outwardly under the resilient fingers 21 which will yield as the bead 19 passes the corner junctions between the elongated portions of the fingers and the end portions 23 thereof.

As previously stated, the weight 18, like the trim ring 17 is preferably associated with the wheel assembly in snap-on, pry-off relationship and accordingly, this retention of the weight 18 is also accomplished by means of the retaining ring 22. As will be shown presently, the retaining ring is so constructed and arranged that the retention of the weight 18 and the trim ring 17 thereby urges parts thereof resiliently toward one another whereby the presence of the weight 18 and the trim ring 17 in operative position causes the retaining member 22 to react upon the other to provide augmented locking engagement. To this end the inner ends of the fingers 24 terminate in an inwardly radially disposed flange 25, the radially outer edge of which abuts the flange 13 of the rim to maintain the member 22 in ultimate position. The flange 25 in turn terminates in an axially outwardly disposed flange 26 which extends radially outwardly toward the surface of the rim and with the flange 27 and the fingers 21 forms a resilient re-entrant configuration which is adapted to spring radially outwardly about the flange 25 and its junction with the flange 26 to maintain the wheel balancing weight 18 in operative position, as will be described presently. Similarly, as previously explained, the fingers 21 are adapted to spring resiliently inwardly to engage the bead 19 of the trim ring 17.

Figure 5:
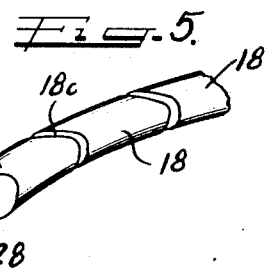
Figure 5 is a fragmentary perspective view of a part of the wheel balancing weight spiral shown in Figure 4 and illustrating the manner in which the weights are connected together prior to their separation for use.

By reference to Figure 5, the preferable shape of the wheel balancing weight 18 will be seen. As previously explained, these weights each are formed with an arcuate longitudinal configuration and additionally there is provided in each a groove 28 which extends longitudinally of the individual weight. While of course the specific shape of the weights may be considerably varied to conform to the configuration of the various known shapes of tire rims, it is highly desirable that each weight be provided with a longitudinal section of reduced dimension whereby it may be urged between the rim and the junction of flanges 26 and 27 of the retaining member 22 to urge the same into eccentricity with the wheel assembly as the thicker cross section of the weight passes between the rim and adjacent portion of the retaining member 22 and whereby, when the groove 28 is engaged by the retaining member, the latter may spring back into concentricity with the wheel assembly due to the reduced dimensions afforded by the groove. It will be readily understood that with such a construction the weight is securely locked into its ultimate position by the engagement of the retaining member 22 in the groove 28.

After the weight 18 is inserted in the wheel assembly as above described the trim ring 17 may be secured thereto by snap-on engagement between the head 19 and the resilient fingers 21. As previously explained, such engagement causes a radial outward movement of the fingers 21 and thus the entire re-entrant portion of the retaining member is likewise urged in that direction. As a result of this resilient movement of the fingers 21 by the bead 19, the re-entrant section of the retaining member 22 will be urged generally radially outwardly into tight engagement in the groove 28 of the weight 18 thereby to hold the latter securely in position. Similarly the tension of the fingers 21 against the bead 19 will be increased by the presence of the weight in its operative position.

It is also important that once the weight is placed in the desired position to balance the wheel, it be prevented from slipping along the space between the wheel rim and the retaining means. In the present embodiment this slippage is prevented by the presence of the retaining fingers 24 which provide spaced slots, as will be seen in Figure 1, into which the weight may embed itself to be retained securely in the desired position.

From the foregoing it will be seen that I have provided a wheel construction wherein a single retaining element is utilized to retain both the trim ring 17 and the wheel balancing weight 18 in a desired position; wherein the wheel balancing weight may be inserted or removed from the construction without removing the retaining means; wherein the retaining means and the wheel balancing weight are concealed by a neat and attractive appearing trim ring; wherein the trim ring is likewise maintained in its proper position by a snap-on, pry-off engagement and wherein the snap-on engagement of the wheel balancing weight in the trim ring serves to maintain the other with increased security in its ultimate position.

Figure 4:
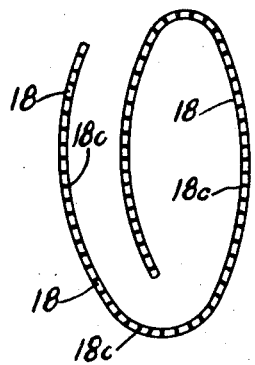
Figure 4 is a perspective view of wheel balancing weights in spiral form as made in accordance with the features of the method of my invention.

As previously explained, the weights 18 are preferably formed with a longitudinal arcuate configuration and with grooves on at least one side thereof. To the end that this arcuate configuration and groove formation may be obtained by means of a minimum of manufacturing operations thereby to reduce the cost of the weights it is contemplated that they be made from lead or the like and rolled into long lengths, the rollers being so positioned that the completed lengths of weight assume a spiral form thereby imparting to each individual weight the desired arcuate longitudinal configuration. Furthermore, to the end that the weights may be easily separated from the lengths provided without necessitating a cutting operation, the lengths of weight may be scored or otherwise weakened at spaced points as at 18c in Figures 4 and 5. Thus it will be seen that as the individual weights are needed, they may be removed from the spiral length by bending or twisting with the hands.

From the foregoing it will be seen that there is provided herein an improved method of manufacturing wheel balancing weights which provides a construction of the desired shape and configuration and which requires a minimum of manufacturing operations and expense. Furthermore, the weights are manufactured in convenient form for shipping and may be easily removed individually for use from the spiral lengths provided.

What I claim is:

1. In a method of manufacturing wheel balancing weights, the steps of rolling soft metal on the order of lead into a curved strip of curved cross-sectional shape and forming a groove on the radially inner side of the curved strip, transversely scoring said strip at spaced intervals and thereafter severing weight sections from said strip along said scorings.

2. The method of making wheel balancing weights adapted to be assembled with a wheel structure including an angularly shouldered annular retainer opposing in weight-receiving spaced relation an annular axially extending flange on the wheel structure so as to receive a wheel balancing weight wedged therebetween, which comprises the steps of forming soft metal into a strip of substantial length and of such rounded cross-sectional shape as to facilitate wedging assembly thereof laterally between the retaining shoulder and opposing wheel flange, bending the strip into substantially flat-lying open spiral form on a radius substantially the same as the annular flange and retaining shoulder, forming a groove longitudinally on the inner side of the strip for interlockingly engaging the retainer shoulder, and providing the strip with scorings partially severing it into individual weights adapted to be separated from the strip.

GEORGE ALBERT LYON.

REFERENCES CITED

The following references are of record in the file of this patent:

UNITED STATES PATENTS

| Number | Name | Date |
|---|---|---|
| 734,417 | Hubbell | July 21, 1903 |
| 1,450,346 | Anderson | Apr. 3, 1923 |
| 1,573,545 | Hamilton | Feb. 16, 1926 |
| 1,615,094 | McFarland | Jan. 18, 1927 |
| 1,620,871 | Carrey | Mar. 15, 1927 |
| 1,621,380 | Ruder | Mar. 15, 1927 |
| 1,650,394 | Shores | Nov. 22, 1927 |
| 2,029,132 | Skelton | Jan. 28, 1936 |
| 2,122,065 | Hume | June 28, 1938 |
| 2,128,437 | Stenwall | Aug. 30, 1938 |